(12) United States Patent
Junio et al.

(10) Patent No.: US 11,050,629 B2
(45) Date of Patent: Jun. 29, 2021

(54) FINGERPRINT DETERMINATION FOR NETWORK MAPPING

(71) Applicant: Palo Alto Networks, Inc., Santa Clara, CA (US)

(72) Inventors: Timothy Junio, San Francisco, CA (US); Matthew Kraning, San Francisco, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 130 days.

(21) Appl. No.: 15/342,991

(22) Filed: Nov. 3, 2016

(65) Prior Publication Data

US 2018/0123894 A1      May 3, 2018

(51) Int. Cl.
| | |
|---|---|
| *H04L 12/24* | (2006.01) |
| *H04L 9/32* | (2006.01) |
| *H04L 29/08* | (2006.01) |
| *H04L 9/30* | (2006.01) |
| *H04L 29/06* | (2006.01) |
| *H04W 12/79* | (2021.01) |

(52) U.S. Cl.
CPC ............ *H04L 41/12* (2013.01); *H04L 9/3231* (2013.01); *H04L 9/3263* (2013.01); *H04L 67/02* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 9,633,205 B2* | 4/2017 | Guan | G06F 21/56 |
| 2002/0046286 A1 | 4/2002 | Caldwell et al. | |
| 2005/0154733 A1 | 7/2005 | Meltzer et al. | |
| 2005/0289072 A1 | 12/2005 | Sabharwal | |
| 2007/0094491 A1* | 4/2007 | Teo | H04L 63/1408 713/153 |
| 2009/0006600 A1* | 1/2009 | Siegmund | H04L 41/08 709/223 |
| 2013/0005296 A1 | 1/2013 | Papakostas et al. | |
| 2013/0007882 A1* | 1/2013 | Devarajan | H04L 63/1416 726/24 |
| 2013/0174263 A1* | 7/2013 | Nunez Di Croce | H04L 63/1433 726/25 |
| 2014/0283061 A1* | 9/2014 | Quinlan | H04L 63/1408 726/23 |
| 2016/0164866 A1* | 6/2016 | Oberheide | H04L 63/0861 726/1 |
| 2016/0232563 A1 | 8/2016 | Perez et al. | |
| 2016/0306974 A1* | 10/2016 | Turgeman | G06Q 20/4016 |
| 2020/0019702 A1* | 1/2020 | Tong | G06F 21/566 |

* cited by examiner

*Primary Examiner* — Aaron N Strange
*Assistant Examiner* — Mohammad Yousuf A. Mian
(74) *Attorney, Agent, or Firm* — Gilliam IP PLLC

(57) ABSTRACT

A system for determining fingerprints includes an interface to receive an indication to determine fingerprints using a set of client data, and a processor to determine a set of indicators based at least in part on the client data and for one or more indicators of the set of indicators, determine whether the indicator comprises a fingerprint based at least in part on a frequency analysis, and in the event it is determined that the indicator comprises a fingerprint, store the fingerprint in a fingerprint database associated with the client.

22 Claims, 9 Drawing Sheets

FINGERPRINT DETERMINATION FOR NETWORK MAPPING

BACKGROUND OF THE INVENTION

Internet connected assets (e.g., computers, mobile devices, server systems, client systems, internet-of-things devices, etc.) include computing systems in communication with the Internet. Internet connected assets commonly have one or more publicly addressable communication ports, allowing any Internet connected device to query the asset. Some devices allow a range of connection types (e.g., HTTP connections HTTPS connections, FTP connections, FTPS connections, telnet connections, SSH connections, etc.) over the one or more publicly accessible ports. Internet connected assets can be a wide range of different types of hardware devices running a wide range of software including a wide range of configuration options, creating a myriad of possibilities for security vulnerabilities. A typical systems administrator may not be aware of every detail of every system under his or her watch, creating a problem where system vulnerabilities may go undetected and unfixed.

BRIEF DESCRIPTION OF THE DRAWINGS

Various embodiments of the invention are disclosed in the following detailed description and the accompanying drawings.

DETAILED DESCRIPTION

Figure 1:
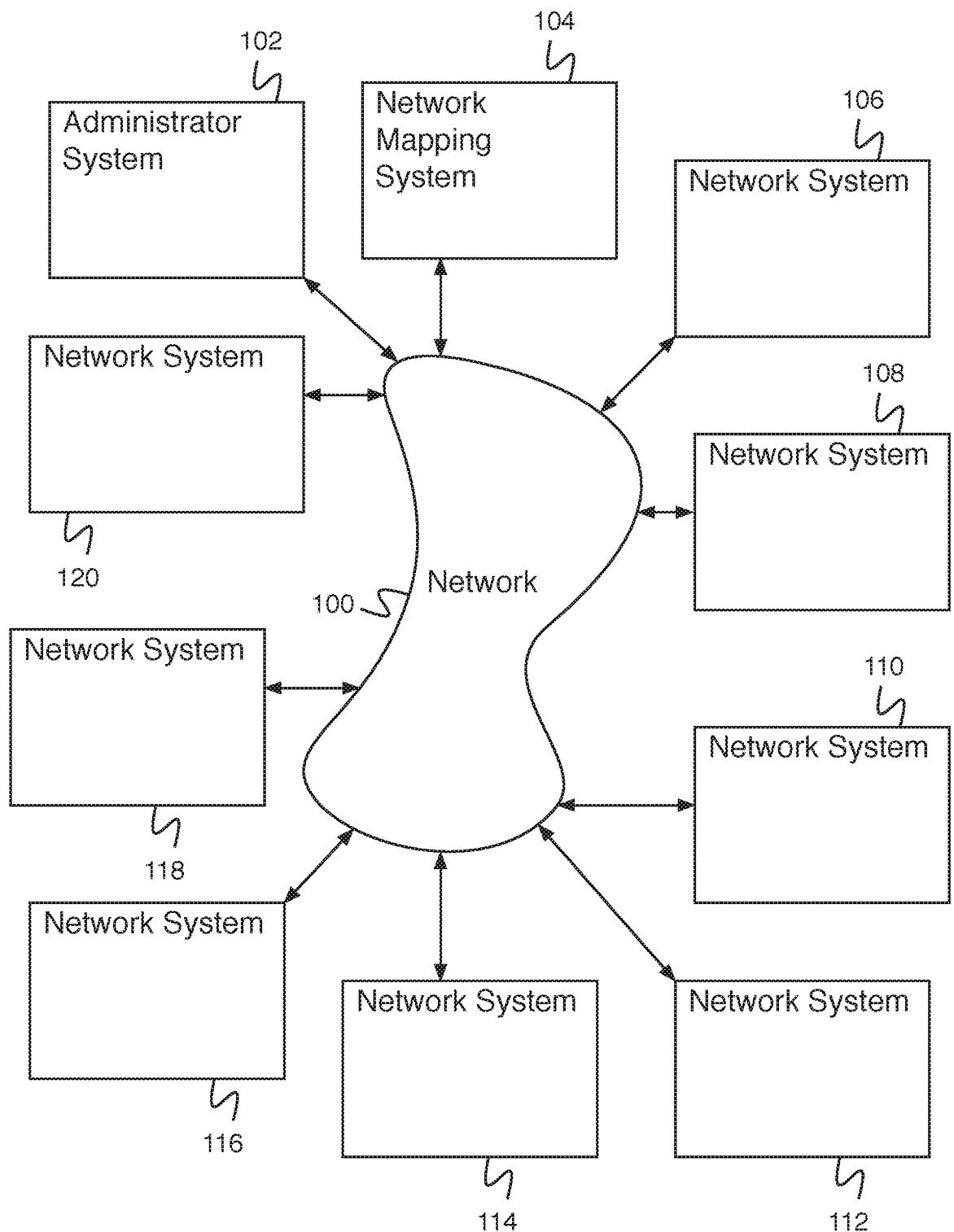
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining fingerprints comprises an interface to receive an indication to determine fingerprints using a set of client data, and a processor to determine a set of indicators based at least in part on the client data and for one or more indicators of the set of indicators, determine whether the indicator comprises a fingerprint based at least in part on a frequency analysis, and in the event it is determined that the indicator comprises a fingerprint, store the fingerprint in a fingerprint database associated with the client. In some embodiments, the system for determining fingerprints additionally comprises a memory coupled to the processor and configured to provide the processor with instructions.

In some embodiments, a system for network mapping using a fingerprint comprises a system for identifying computer systems associated with a client network. The fingerprint comprises an identifying criterion or criteria for a computer system. In some embodiments, the fingerprint comprises a set of publicly available information known to be associated with the client network. In various embodiments, a fingerprint comprises a set of open ports (e.g., a specific set of open ports that have been determined to be correlated with the client network), a set of services and associated ports, a webpage component, a web application and associated set of components, an encryption certificate, a public encryption key, a text string, a text string pattern, a domain name, a host name, a host name pattern, a combination of identifying elements, or any other appropriate fingerprint information. In some embodiments, the system for network mapping maps a client network by exhaustively scanning network data and identifying network data that matches the fingerprint. In some embodiments, the system for network mapping scans data collected by a network scanner and stored in a network database (e.g., a network scanning tool first collects all possible information about the network—e.g., the entire Internet—and stores it in a network information database; the system for network mapping then scans the data in the network information database for systems with stored information that matches the fingerprint). In some embodiments, the system for network mapping scans network addresses on the Internet and analyzes received information for systems that return information that matches the fingerprint. When a system is found that is determined to be part of the client network (e.g., its information matches the fingerprint information), the address associated with the system is stored in a client network database. In some embodiments, other system information is additionally stored in the client network database.

In some embodiments, the system for network mapping additionally comprises a system for fingerprint determination. In some embodiments, the system for fingerprint determination comprises a system for automatically determining a fingerprint or a set of fingerprints that accurately distinguish network systems that are part of the client network from network systems that are not part of the client network. The system for determining a fingerprint comprises an indicator determiner for determining a set of identifiers based at least in part on client data. In some embodiments, identifiers comprise potential fingerprints (e.g., a set of identifying data that can comprise a fingerprint but that has not yet been determined whether it accurately distinguishes network systems that are part of the client network from network systems that are not part of the client network). The indicator determiner scans the client data and selects each element comprising identifier data (e.g., an open port, a service and associated port, a webpage component, a web application and associated set of components, an encryption certificate, a public encryption key, a text string, a text string pattern, a domain name, a host name, a host name pattern, etc.). Each indicator is added to a set of indicators. A determination is then made for one or more indicators of the set of indicators (e.g., all of the indicators, a subset of the indicators) whether or not the indicator comprises a fingerprint. The determination is made based at least in part on a frequency analysis. In some embodiments, the frequency analysis comprises a comparison of the frequency the indicator matches network systems within a known client network with the frequency the indicator matches network systems on the Internet. In some embodiments, in the event the indicator matches network systems of the client at a much higher rate than network systems on the Internet, it is determined that the indicator comprises a fingerprint. In some embodiments, determining that the indicator comprises a fingerprint comprises determining that the indicator matches systems within the client network at greater than a threshold frequency. In some embodiments, determining that the indicator comprises a fingerprint comprises determining that the indicator matches systems on the Internet at less than a threshold frequency.

In various embodiments, indicators are single identifiers, pairs of identifiers, triplets of identifiers, or any other combination of identifiers. Each indicator is analyzed by determining whether the indicator appears frequently in the known client network and infrequently in the internet as a whole. For example, an indicator meets this criterion in the event that the indicator frequency in the known client network is above a client network match threshold and the indicator frequency in the internet as a whole is below an internet match threshold. Indicators meeting this criterion are candidate fingerprints that can be ranked by a score. A candidate fingerprint can be accepted as a fingerprint in the event that the score is above a threshold or in the event that the fingerprint is in the top N number of candidate fingerprints (e.g., a certain number of fingerprints).

In some embodiments, the indicators in the set of indicators are not all analyzed—for example, in the event that initially all combinations of 3 identifiers are analyzed on the internet and within the client's network, but after analysis of a percentage of the set indicators a sufficient number of fingerprints have been selected, then the rest of the set is not analyzed. In some embodiments, the analysis of the set is processed in order of highest score to lowest score, where the score indicates a likelihood of being a fingerprint. For example, a score is calculated based at least in part on the percentile of the frequency of occurrence of the indicator within the client network (percentile_$f_{client}$) and the percentile of the frequency of occurrence of the indicator in the internet (percentile_$f_{internet}$).

FIG. 1 is a block diagram illustrating an embodiment of a network system. In some embodiments, the network system of FIG. 1 comprises a system for network mapping using a fingerprint. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102 and network mapping system 104 communicate via network 100. Administrator system 102 comprises a system for an administrator. In various embodiments, administrator system 102 comprises a system for an administrator to access applications on an application system, to access data on a database system, to indicate to network mapping system 104 to perform a network mapping process, to receive data from network mapping system 104, to configure a network system (e.g., network system 106), to receive data from a network system, or for any other appropriate purpose. In some embodiments, administrator system 102 comprises a processor and a memory. Network mapping system 104 comprises a system for mapping a client network. For example, network mapping system 104 scans data associated with network systems (e.g. network system 106, network system 108, network system 110, network system 112, network system 114, network system 116, network system 118, and network system 120) in response to a command from administrator system 102. Analysis of network systems includes analyzing current network data and previously stored data associated with the set of network systems. In some embodiments, scanning data associated with a set of network systems comprises providing a payload to one or more network systems of the set of network systems and analyzing the received response (in the event that a response is received). In some embodiments, analyzing a received response from a network system comprises determining whether the response matches a fingerprint. Network mapping system 104 comprises a system for determining fingerprints. In some embodiments, fingerprints are automatically determined based at least in part on client data (e.g., client network identification information). For example, fingerprints are determined based at least in part on a known client network (e.g., one or more network systems of the set of network systems are known to be associated with the client network—for example, the client network for which all associated systems are to be determined). In some embodiments, fingerprints are determined based at least in part on a frequency analysis (e.g., by comparing the frequency a potential fingerprint matches information stored on network systems that are part of the known client network with the frequency the potential fingerprint matches information stored on all accessible network systems (e.g., all network systems on the Internet). In some embodiments, network mapping system 104 comprises a processor and a memory. Each network system of FIG. 1 (e.g., network system 106) comprises an Internet connected system (e.g., a desktop computer, a laptop computer, a smartphone, a tablet computer, a server system, an internet-of-things device, etc.). In various embodiments, the system of FIG. 1 comprises 8, 13, 197, 2222, one million, one hundred million, or any other appropriate number of network systems. In some embodiments, each network system of FIG. 1 is associated with an Internet address. In some embodiments, an Internet address comprises an Internet Protocol (IP) address.

Figure 2:
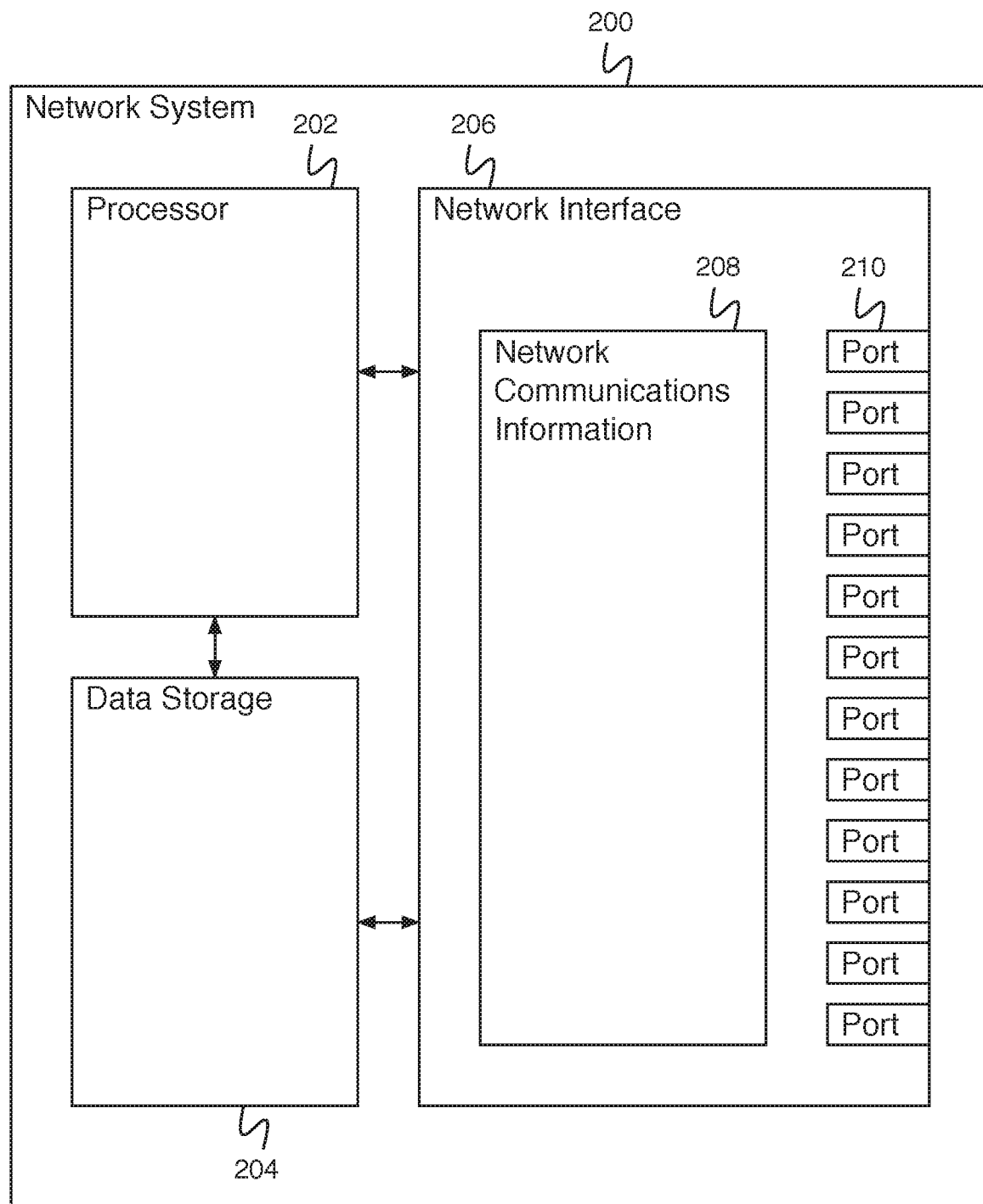
FIG. 2 is a block diagram illustrating an embodiment of a network system.

FIG. 2 is a block diagram illustrating an embodiment of a network system. In some embodiments, network system 200 comprises a network system of FIG. 1 (e.g., network system 106). In the example shown, network system 200 comprises processor 202, data storage 204, and network interface 206. In some embodiments, network system 200 comprises an Internet connected asset (e.g., a desktop computer, a laptop computer, a smartphone, a tablet computer, a server system, an Internet-of-things device, or any other appropriate Internet connected asset). In various embodiments, processor 202 comprises a processor for executing instructions, processing data, responding to commands, etc. In various embodiments, processor 202 comprises a general-purpose processor, a microcontroller, a parallel processing system, a cluster of processors, or any other appropriate processor. Data storage 204 comprises a data storage for storing data, for storing instructions for processor 202, for storing configuration information, or for storing any other appropriate information. In various embodiments, data storage 204 comprises one or more of a volatile memory, a non-volatile memory, a magnetic memory, an optical memory, a phase-change memory, a semiconductor memory, a disc memory, a tape memory, or any other appropriate memory. Network interface 206 comprises a network interface for communicating with a network. In the example shown, network interface 206 comprises network communications information 208 and a plurality of ports (e.g., port 210). Network communications information 208 includes network communications software, network communications settings, network communications data, or any other appropriate network communications information. The plurality of ports comprises physical ports (e.g., plugs for connecting cables to network system 200) or virtual ports (e.g., virtual communications channels identified by a virtual port number). In some embodiments, network interface 206 comprises a network address (e.g., a network address assigned by an external network addressing authority). In some embodiments, communication with network system 200 is specified by indicating the network address of network 200 along with a port number. In some embodiments, some ports of network interface 206 are configured for communication (e.g., comprising open ports) and some are configured to not respond to communication. In some embodiments, open port configuration information is stored in network communications information 208. In some embodiments, some ports are associated with one or more specific communications services (e.g., hypertext transmission protocol (HTTP), file transfer protocol (FTP), secure shell (SSH), etc.). In some embodiments, configuration information associating services with ports is stored in network communications information 208. In some embodiments, network communications information 208 comprises webpage (e.g., non-rendered webpage comments, organization specific images and GIFs, etc.) and web application and web application component information (e.g., $1^{st}$ party and $3^{rd}$ party javascript code, API calls, web application configuration and version information, etc.) In some embodiments, network communications information 208 comprises encryption information (e.g., a public SSH key, a certificate, etc.). In some embodiments, network communications information 208 comprises a network system name or names (e.g., a hostname, a domain name, a set of hostnames, a hostname pattern, etc.). In some embodiments, network communications information comprises text information associated with a service or a set of services (e.g., a welcome text, a connection refused text, a service not supported text, a file not found text, or any other appropriate text information). In some embodiments, network interface 206 comprises a set of network hardware (e.g., a modem) running a set of communications software that has been configured according to a set of communications specifications.

Figure 3:
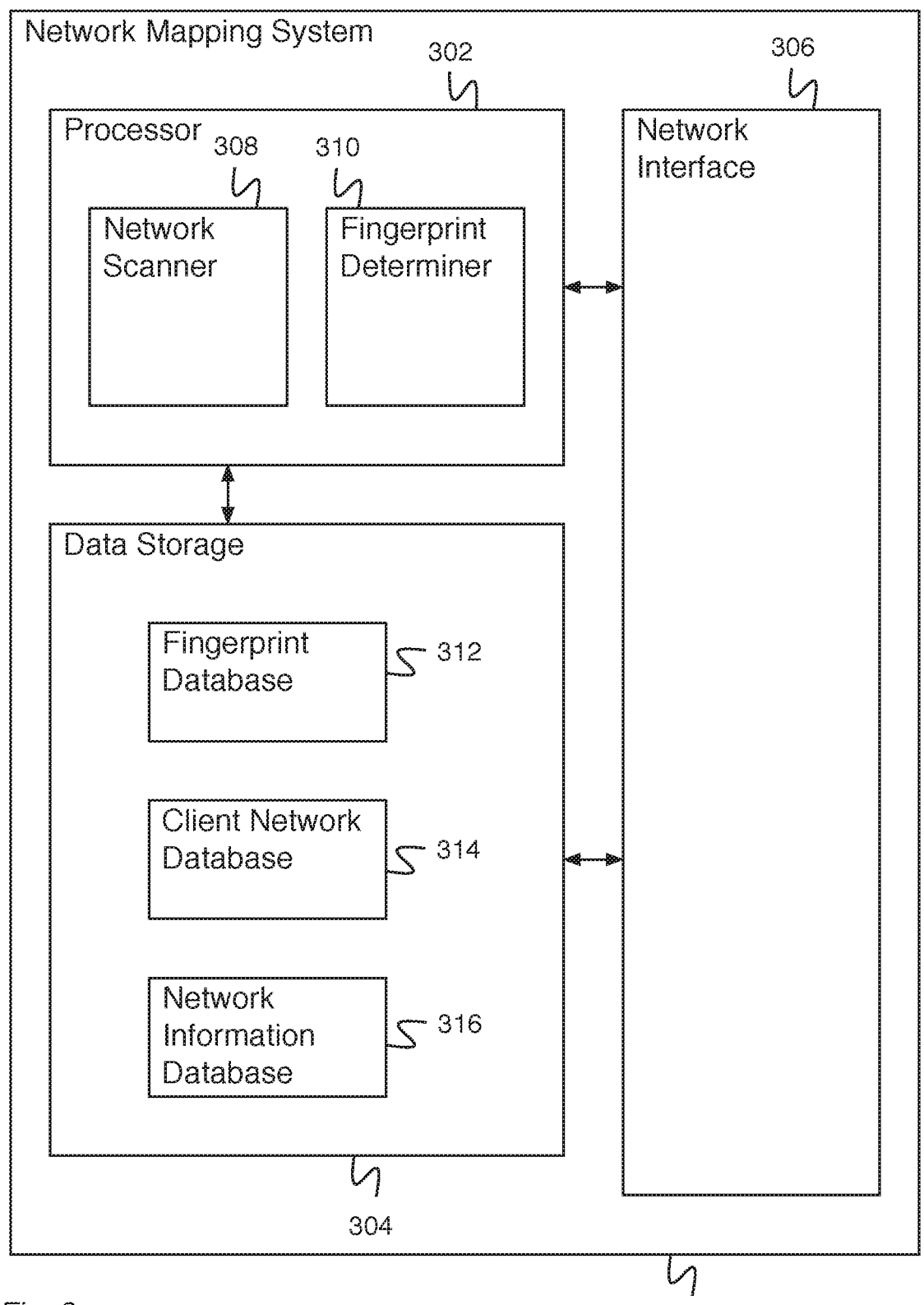
FIG. 3 is a block diagram illustrating an embodiment of a network mapping system.

FIG. 3 is a block diagram illustrating an embodiment of a network mapping system. In some embodiments, network mapping system 300 comprises network mapping system 104 of FIG. 1. In some embodiments, network mapping system 300 comprises a server system. In the example shown, network mapping system 300 comprises processor 302, data storage 304, and network interface 306. Processor 302 comprises a processor for executing instructions, processing data, responding to commands, etc. In various embodiments, processor 302 comprises a general-purpose processor, a microcontroller, a parallel processing system, a cluster of processors, or any other appropriate processor. Processor 302 includes network scanner 308 with software and/or hardware that implements network mapping system functionality. Processor 302 includes fingerprint determiner 310 for determining fingerprints for use by network scanner 308.

In various embodiments, data storage 304 comprises a data storage for storing data, for storing instructions for processor 302, for storing configuration information, or for storing any other appropriate information. In various embodiments, data storage 304 comprises one or more of a volatile memory, a non-volatile memory, a magnetic memory, an optical memory, a phase-change memory, a semiconductor memory, a disc memory, a tape memory, or any other appropriate memory. In the example shown, data storage 304 comprises fingerprint database 312 for storing fingerprints for identifying network systems. In some embodiments, fingerprints stored in fingerprint database are each associated with a client network. In some embodiments, a fingerprint comprises one or more network identifying characteristics. In some embodiments, network identifying characteristics comprise network communications information settings (e.g., a set of open ports, a set of services and associated ports, a webpage component, a web application and set of web application set of components, encryption information, host name information, domain name information, text information, etc.). In some embodiments, fingerprints stored by fingerprint database 312 are determined by fingerprint determiner 310. Data storage 304 additionally comprises client network database 314 for storing client network information (e.g., Internet addresses—for example, IP addresses—associated with the client network, network system information associated with network systems associated with the client network, etc.). In some embodiments, after a network mapping process is executed, client network database 314 comprises a set of client network information describing the extent of the client network (e.g., identifying all network systems found that are associated with the client network). Data storage 304 additionally comprises network information database 316 for storing network information. In some embodiments, network information comprises network information received as a result of scanning a network. In some embodiments, network information comprises responses compiled by scanning the Internet. In some embodiments, scanning the Internet comprises providing a payload (e.g., a predetermined data packet or set of packets) to a set of Internet addresses. In some embodiments, scanning a network comprises collecting network information from a set of network systems. In some embodiments, scanning a network comprises collecting network information from all accessible network systems. In various embodiments, network information comprises network communications information settings, network addresses, information received by interactively querying network systems (e.g. information received by performing a follow-up probe in response to an indication of an active service running on the network system), or any other appropriate network information. In some embodiments, network information is stored remotely (e.g., on a storage server, on a different network system, on cloud storage, etc.). In the example shown, network interface 306 comprises a network interface for interacting with remote systems via a network. In some embodiments, network interface 306 comprises a network interface configured for high bandwidth communication.

Figure 4:
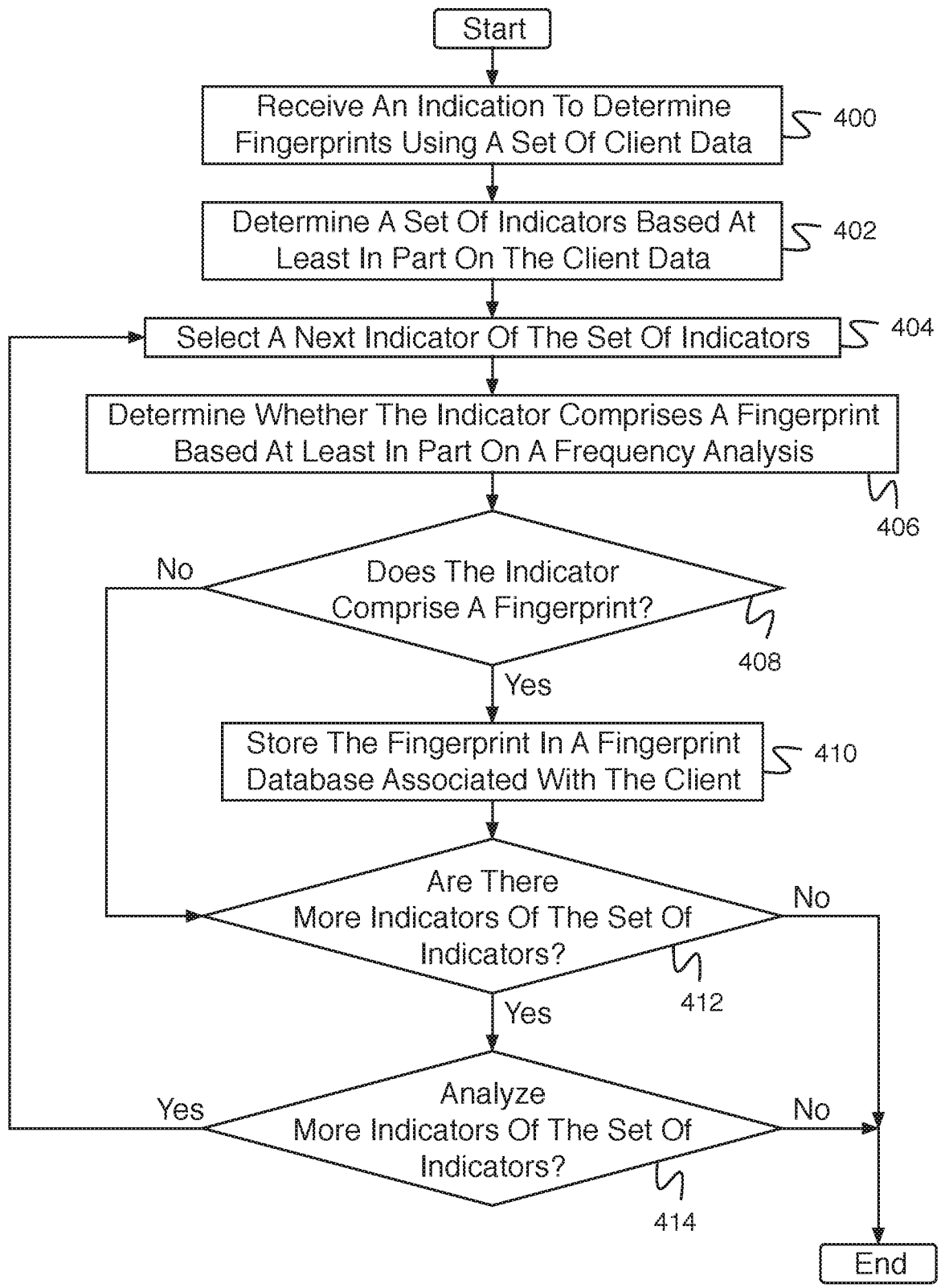
FIG. 4 is a flow diagram illustrating an embodiment of a process for determining fingerprints.

FIG. 4 is a flow diagram illustrating an embodiment of a process for determining fingerprints. In some embodiments, the process of FIG. 4 is executed by a network mapping system (e.g., network mapping system 104 of FIG. 1). In the example shown, in 400, an indication to determine fingerprints using a set of client data is received. For example, the set of client data comprises a known client network (e.g., a set of addresses of computers known to be part of the client network) or network configuration information (e.g., a set of configuration data associated with computers that are part of the client network). In 402, a set of indicators is determined based at least in part on the client data. For example, indicators comprise potential fingerprints (e.g., a set of one or more system identifying characteristics as in a fingerprint, wherein it has not yet been determined whether the indicator is able to distinguish network systems associated with the client from network systems not associated with the client). In some embodiments, the set of indicators comprises the set of network identifying elements determined from the client data. In some embodiments, the set of indicators additionally includes all combinations of network identifying elements determined from the client data (e.g., all pairwise combinations, all combinations of 3 elements, all combinations of 4 elements, etc.). In 404, a next indicator of the set of indicators is selected. In some embodiments, the next indicator comprises the first indicator. In 406, it is determined whether the indicator comprises a fingerprint based at least in part on a frequency analysis. In some embodiments, determining whether the indicator comprises a fingerprint comprises determining whether the indicator is able to distinguish network systems associated with the client from network systems not associated with the client. In some embodiments, determining whether the indicator comprises a fingerprint comprises comparing a frequency that the indicator is determined to match data associated with systems within a known client network with a frequency that the indicator is determined to match data associated with systems on the Internet. In 408, in the event it is determined that the indicator does not comprise a fingerprint, control passes to 412. In the event it is determined that the indicator comprises a fingerprint, control passes to 410. In 410, the fingerprint is stored in a fingerprint database associated with the client. In 412, it is determined whether there are more indicators of the set of indicators. In the event it is determined that there are not more indicators of the set of indicators, the process ends. In the event it is determined that there are more indicators of the set of indicators, control passes to 414. In 414, it is determined whether to analyze more indicators of the set of indicators. In some embodiments, only one or more indicators of the set of indicators (e.g., fewer than the complete set of indicators) are analyzed. In some embodiments, all indicators of the set of indicators are analyzed. In various embodiments, it is determined to stop analyzing indicators after a particular level of combinations is analyzed (e.g., after combinations of 3 elements are analyzed), after a measured frequency of occurrences within the known client network drops below a threshold (e.g., after it is determined that all combinations of 4 elements match fewer than a threshold fraction of network systems within the known client network), after a predetermined number of fingerprints are determined, or it is determined to stop analyzing indicators for any other appropriate reason. In the event it is determined not to analyze more indicators, the process ends. In the event it is determined to analyze more indicators, control passes to 404.

Figure 5:
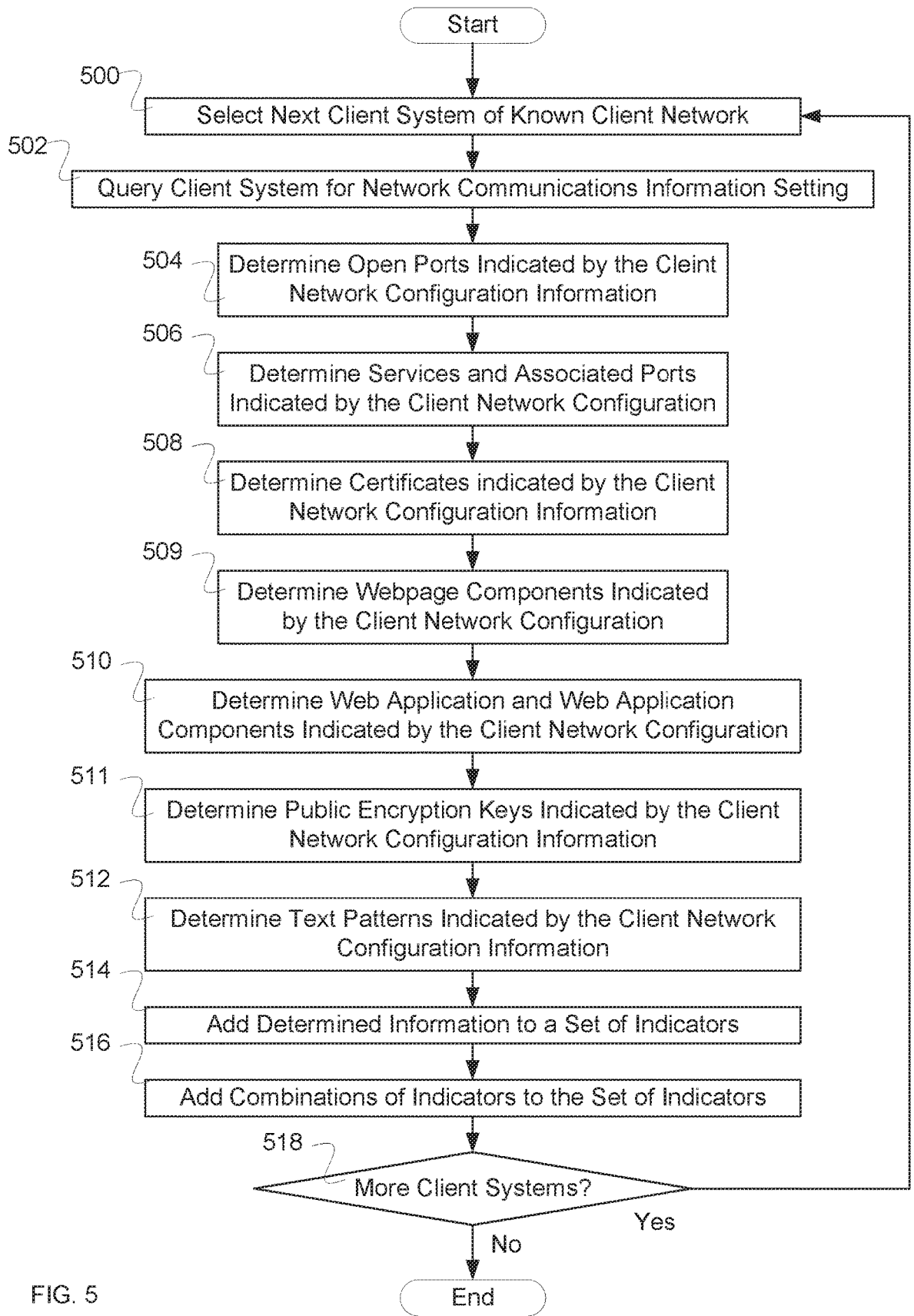
FIG. 5 is a flow diagram illustrating an embodiment of a process for determining a set of indicators based at least in part on client data.

FIG. 5 is a flow diagram illustrating an embodiment of a process for determining a set of indicators based at least in part on client data. In some embodiments, the process of FIG. 5 is used to implement 402 of FIG. 4. The process of FIG. 5 is for determining a set of indicators based at least in part on client data of a known client network. In the example shown, in 500, a next client system of the known client network is selected. In some embodiments, the next client system comprises the first client system. In 502, the client system is queried for network communications information settings. In various embodiments, network communications information settings comprise system configuration files, system configuration scripts, system description files, system responses to one or more communications queries (e.g., a telnet query, a ftp query, a ping, etc.), or any other appropriate network communications information settings. In 504, open ports (e.g., ports that respond to a communications request) indicated by the network communications information settings are determined. In 506, services and associated ports (e.g., network services determined to be accessible via an associated port) indicated by the network communications settings are determined. In 508, certificates indicated by the network communications information settings are determined. In 509, webpage components (e.g., non-rendered comments in the webpage, $3^{rd}$ party API calls, etc.) indicated by the network communications information settings are determined. In 510, web application and web application components (e.g., application version and configuration information, $3^{rd}$ party application set of components, etc.) indicated by the network communications information settings are determined. In 511, public encryption keys indicated by the network communications information settings are determined. In 512, text patterns indicated by the network communications information settings are determined. In some embodiments, text patterns comprise text patterns determined not to be default text patterns (e.g., text patterns produced by an unmodified configuration of a network service). In some embodiments, text patterns comprise text patterns determined to be associated with a client (e.g., a client name, a modification of a client name, a client domain name, a client server name, a client motto, a client advertising phrase, a client internally used phrase, or any other appropriate client associated phrase). In 514, the determined information (e.g., information determined in 504, 506, 508, 510, and 512) is added to a set of indicators. In 516, combinations of indicators (e.g., pairwise combinations of indicators of the set of indicators, combinations of 3 indicators of the set of indicators, combinations of 4 indicators of the set of indicators, etc.) are added to the set of indicators. In 518, it is determined whether there are more client systems (e.g., in the known client network). In the event it is determined that there are more client systems in the client network, control passes to 500. In the event it is determined that there are not more client systems in the client network, the process ends.

Figure 6:
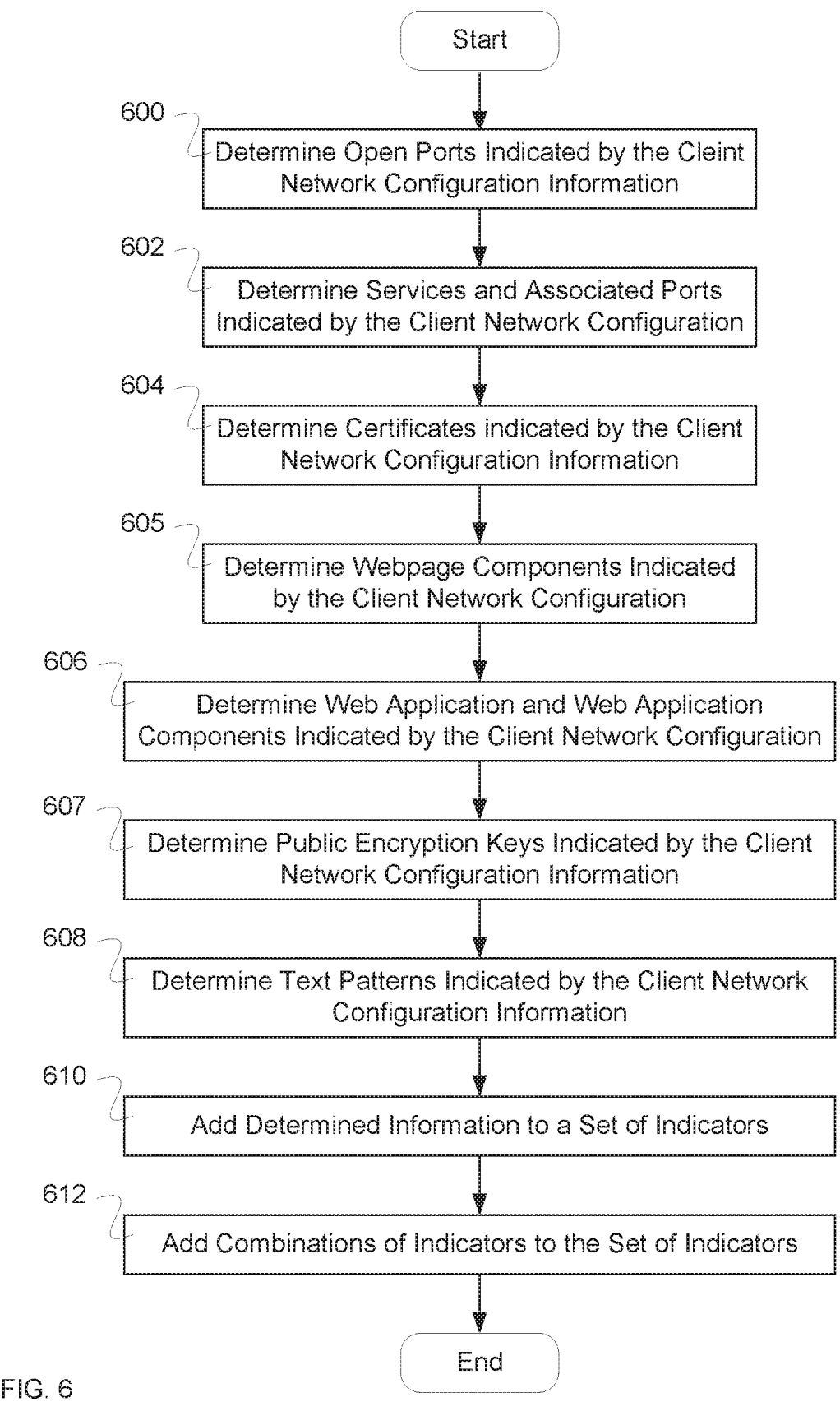
FIG. 6 is a flow diagram illustrating an embodiment of a process for determining a set of indicators based at least in part on client data.

FIG. 6 is a flow diagram illustrating an embodiment of a process for determining a set of indicators based at least in part on client data. In some embodiments, the process of FIG. 6 is used to implement 402 of FIG. 4. The process of FIG. 6 is for determining a set of indicators based at least in part on client data of network configuration information (e.g., network configuration information provided by a client, a client system administrator, etc.). In the example shown, in 600, open ports indicated by the client network configuration are determined. In 602, services and associated ports indicated by the client network configuration are determined. In 604, certificates indicated by the client network configuration are determined. In 605, webpage components indicated by the client network configuration are determined. In 606, web application and web application components indicated by the client network configuration are determined. In 607, public encryption keys indicated by the client network configuration are determined. In 608, text patterns indicated by the client network configuration are determined. In 610, determined information (e.g., information determined in 602, 604, 605, 606, 607, 608, and 610) is added to a set of indicators. In 612, combinations of indicators (e.g., pairwise combinations of indicators of the set of indicators, combinations of 3 indicators of the set of indicators, combinations of 4 indicators of the set of indicators, etc.) are added to the set of indicators.

Figure 7:
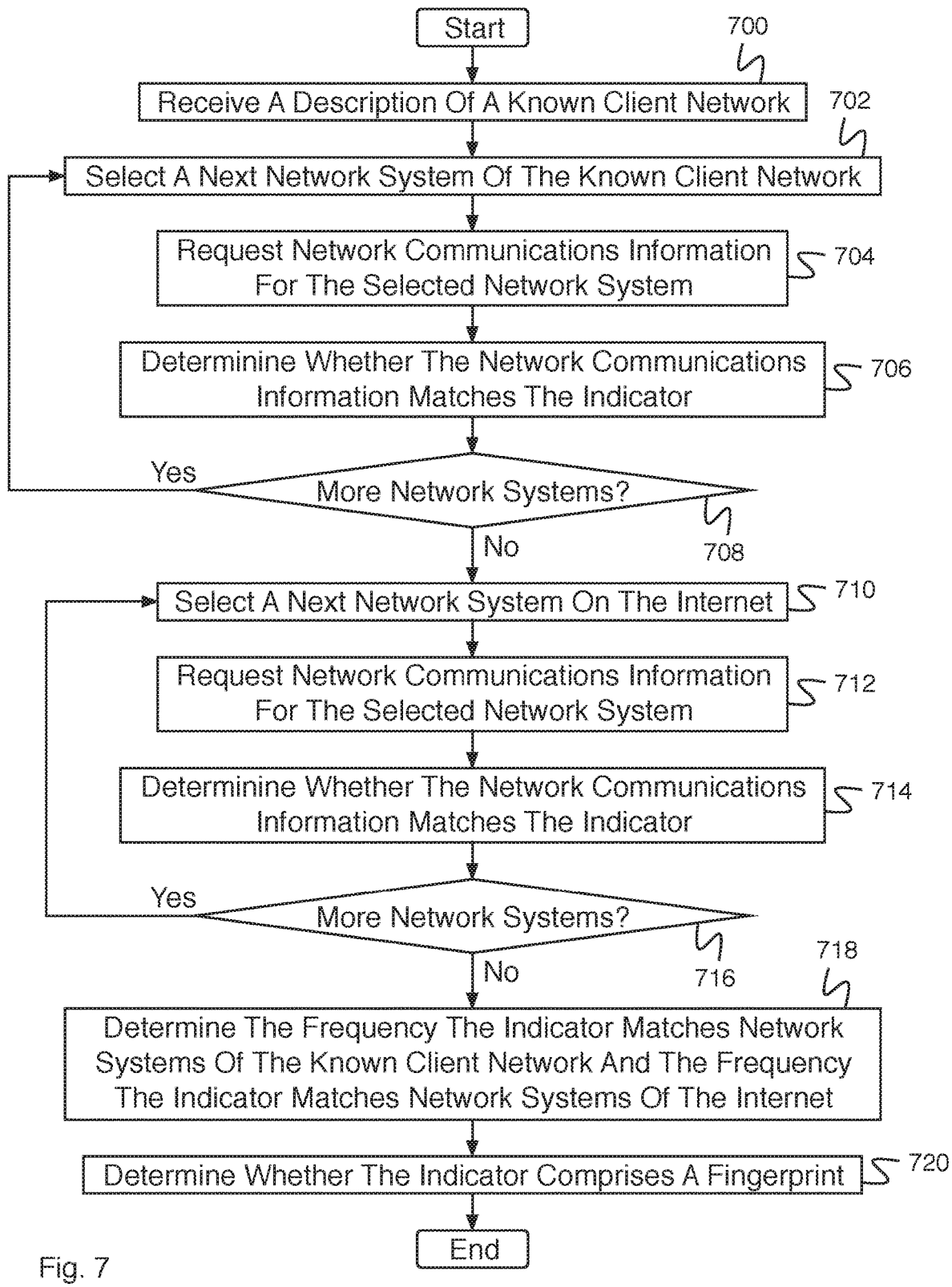
FIG. 7 is a flow diagram illustrating an embodiment of a process for determining whether an indicator comprises a fingerprint based at least in part on a frequency analysis.

FIG. 7 is a flow diagram illustrating an embodiment of a process for determining whether an indicator comprises a fingerprint based at least in part on a frequency analysis. In some embodiments, the process of FIG. 7 implements 406 of FIG. 4. In the example shown, in 700, a description of a known client network is received. In some embodiments, a description of a known client network comprises a set of addresses of network systems known to be associated with the client network. In 702, a next network system of the known client network is selected. In some embodiments, the next network system comprises the first network system. In 704, network communications information for the selected network system is requested. In some embodiments, requesting network communications information for the selected network system comprises communicating with the network system to request network communications information. In some embodiments, network communications information is received in response to the request. In 706, it is determined whether the network communications information matches the indicator (e.g., whether network communications information received in response to the request of 704 comprises information matching the network communications information indicated by the indicator). In 708, it is determined whether there are more network systems (e.g., of the known client network). In the event it is determined that there are more network systems, control passes to 702. In the event it is determined that there are not more network systems, control passes to 710. In 710, a next network system on the Internet is selected. In some embodiments, the next network system on the Internet comprises the first network system on the Internet. In some embodiments, the network systems on the Internet comprise systems sorted by IP address (e.g., the first network system on the Internet comprises the system with the IP address 0.0.0.0 and the last network system on the Internet comprises the system with the IP address 255.255.255.255). In 712, network communication information for the selected network system is requested. In some embodiments, requesting network communications information for the selected network system comprises communicating with the selected network system to request the network communications information. In some embodiments, requesting network communications information comprises requesting stored network communications information (e.g., network communications information stored in a network information database). In 714, it is determined whether the network communications information matches the indicator. In 716, it is determined whether there are more network systems (e.g., on the Internet). In the event it is determined that there are more network systems, control passes to 710. In the event it is determined that there are not more network systems, control passes to 718. In 718, the frequency the indicator matches network systems of the known client network and the frequency the indicator matches network systems of the Internet are determined. In 720, it is determined whether the indicator comprises a fingerprint. In some embodiments, it is determined whether the indicator comprises a fingerprint based at least in part on a frequency analysis. In various embodiments, determining whether the indicator comprises a fingerprint comprises determining whether the frequency the indicator matches network systems of the known client network is greater than the frequency the indicator matches network systems of the Internet, determining whether the frequency the indicator matches network systems of the known client network is much greater than the frequency the indicator matches network systems of the Internet (e.g., is greater by at least a threshold amount), determining whether the frequency the indicator matches network systems of the known client network is greater than a threshold, determining whether the frequency the indicator matches network systems of the Internet is less than a threshold, or in any other appropriate way.

Figure 8:
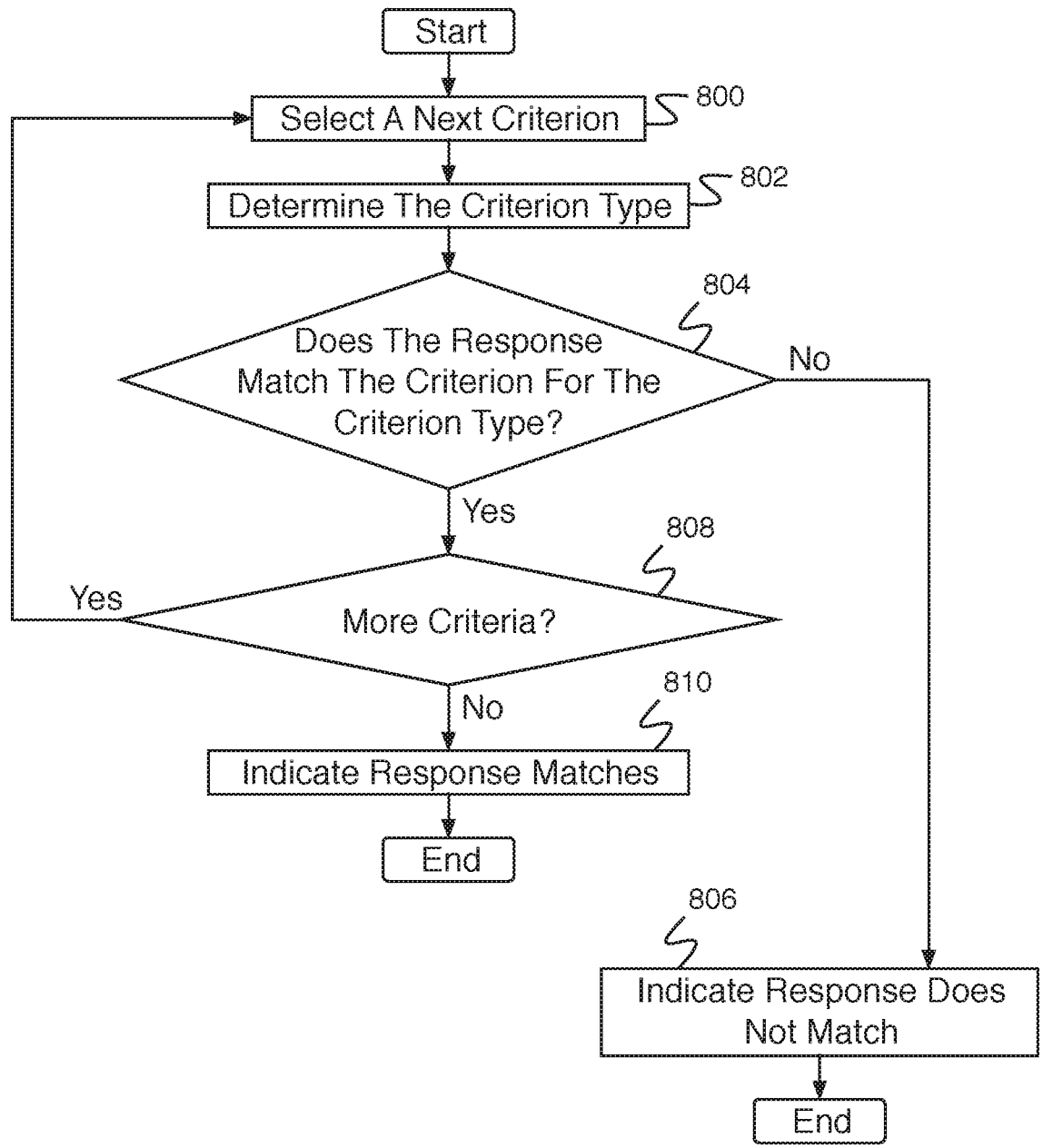
FIG. 8 is a flow diagram illustrating an embodiment of a process for determining whether a response matches an indicator.

FIG. 8 is a flow diagram illustrating an embodiment of a process for determining whether a response matches an indicator. In some embodiments, the process of FIG. 8 comprises a flow diagram for determining whether a response matches a fingerprint. In some embodiments, the process of FIG. 8 implements 706 of FIG. 7 and 714 of FIG. 7. In the example shown, in 800, a next criterion is selected. In some embodiments, the next criterion comprises the first criterion. In 802, the criterion type is determined. In various embodiments, the criterion type comprises a set of open ports criterion type, a set of services and associated ports criterion type, a webpage component criterion type, a web application and associated set of web application components criterion type, a certificate criterion type, a public encryption key criterion type, a text string criterion type, a text pattern criterion type, a domain name criterion type, a host name criterion type, a host name criterion type, or any other appropriate criterion type. In 804, it is determined whether the response matches the criterion for the criterion type. In the event it is determined that the response does not match the criterion for the criterion type, control passes to 806. In 806, the process indicates that the response does not match the indicator, and the process ends. In the event it is determined that the response matches the criterion for the criterion type in 804, control passes to 808. In 808, it is determined whether there are more criteria. In the event it is determined that there are more criteria, control passes to 800. In the event it is determined that there are not more criteria, control passes to 810. In 810, the process indicates that the response matches the indicator. In the example shown, the response is determined to match the indicator only in the event that the response is determined to match all criteria.

Figure 9:
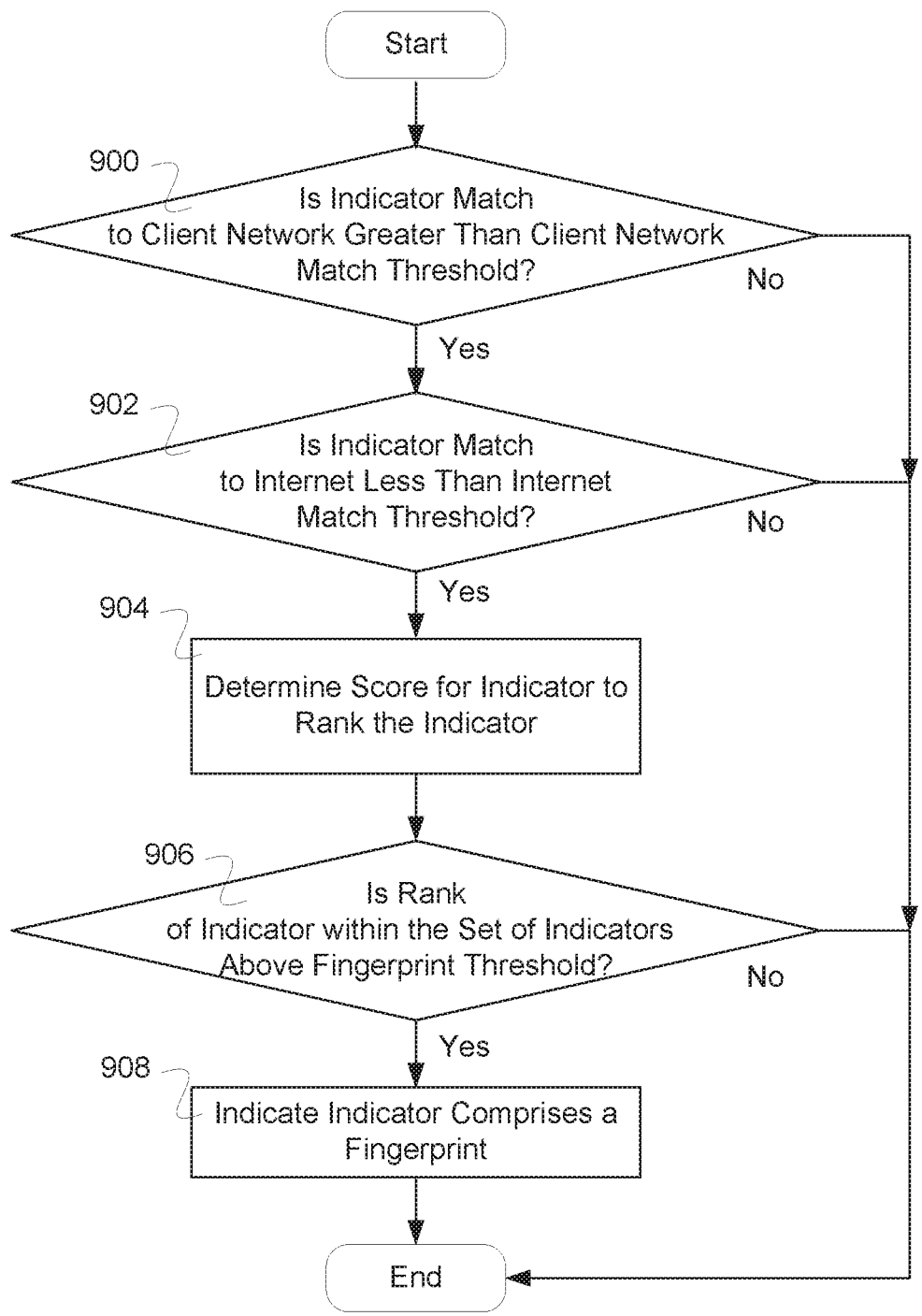
FIG. 9 is flow diagram illustrating an embodiment of a process for determining whether an indicator comprises a fingerprint.

FIG. 9 is flow diagram illustrating an embodiment of a process for determining whether an indicator comprises a fingerprint. In some embodiments, the process of FIG. 9 is used to implement 720 of FIG. 7. In the example shown, in 900 it is determined whether an indicator match to a client network is greater than a client network match threshold. For example, the indicator is associated with X % of the IP addresses of the client network and X % is greater than a client network match threshold of Y %. In the event that the indicator match to a client network is not greater than a client network match threshold, then the process ends. In the event that indicator match to a client network is greater than a client network match threshold, then control passes to 902. In 902, it is determined whether an indicator match to the Internet is less than an internet match threshold. For example, the indicator is associated with Z % of the IP addresses of the internet and Z % is greater than an internet match threshold of W %. In the event that the indicator match to the Internet is not less than an internet match threshold, then the process ends. In the event that that the indicator match to the Internet is less than an internet match threshold, then control passes to 904.

In 904, a score is determined for the indicator to rank the indicator in the set of indicators. For example, a score is determined indicating likelihood of the indicator being a fingerprint. In various embodiments, the score is proportional to one or more of the following: the percentile of the frequency of occurrence of the indicator within the client network (percentile_$f_{client}$), the percentile of the frequency of occurrence of the indicator in the internet (percentile_$f_{internet}$), percentile_$f_{client}$×percentile_$f_{client}$, percentile_$f_{client}$+percentile_$f_{client}$, the rank of the frequency of occurrence of the indicator within the client network (rank_$f_{client}$), the rank of the frequency of occurrence of the indicator in the internet (rank_$f_{internet}$), rank_$f_{client}$×rank_$f_{client}$, rank_$f_{client}$+rank_$f_{client}$, or any other appropriate factor.

In 906, it is determined whether the rank of the indicator within the set of indicators is above a fingerprint threshold. For example, the score is used for each indicator to rank the indicators and it is determined whether the rank of the indicator is above a fingerprint threshold. In the event that the rank of the indicator within the set of indicators is not above a fingerprint threshold, then the process ends. In the event that the rank of the indicator within the set of indicators is above a fingerprint threshold, then in 908 it is indicated that the indicator comprises a fingerprint. For example, the indicator is flagged as a fingerprint and stored in a fingerprint database.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a fingerprint associated with a client network, comprising:
an interface residing outside the client network and configured to communicate with the client network via Internet, the interface to:
receive an indication to determine the fingerprint using client data comprising a set of publicly available information associated with the client network; and
a processor circuit configured to:
determine a set of indicators based at least in part on the client data; and
for an indicator in the set of indicators determine whether the indicator comprises the fingerprint based at least in part on a frequency analysis, the frequency analysis including:
determining a first frequency indicating how frequently the indicator associated with a configuration of a network appears within the client network and a second frequency indicating how frequently the indicator appears within other networks that are different than the client network;
determining that the indicator comprises the fingerprint associated with the client network when all of the following conditions are satisfied:
the first frequency is greater than the second frequency,
the first frequency is above a first threshold, and
the second frequency is below a second threshold; and
in response to completing the frequency analysis to determine whether the indicator comprises the fingerprint, calculate a score associated with the indicator based on the first frequency and the second frequency;
rank the set of indicators based on the score;
create a fingerprint database based on the score by:
traversing the ranked set from a highest score to a lowest score;
adding the traversed indicator to the fingerprint database; and
terminating the traversal when a predetermined number of fingerprints is added to the fingerprint database.

2. The system of claim 1, wherein the client data comprises a known client network.

3. The system of claim 1, wherein the client data comprises client network configuration information.

4. The system of claim 1, wherein determining the set of indicators based at least in part on the client data comprises determining a set of subsets of open ports indicated by the client data.

5. The system of claim 1, wherein determining the set of indicators based at least in part on the client data comprises determining a set of subsets of services and associated ports indicated by the client data.

6. The system of claim 1, wherein determining the set of indicators based at least in part on the client data comprises determining a set of webpage components indicated by the client data.

7. The system of claim 1, wherein determining the set of indicators based at least in part on the client data comprises determining a web application and a set of web application components indicated by the client data.

8. The system of claim 1, wherein determining the set of indicators based at least in part on the client data comprises determining one or more certificates indicated by the client data.

9. The system of claim 1, wherein determining the set of indicators based at least in part on the client data comprises determining one or more public encryption keys indicated by the client data.

10. The system of claim 1, wherein determining the set of indicators based at least in part on the client data comprises determining one or more text patterns indicated by the client data.

11. The system of claim 1, wherein determining the set of indicators based at least in part on the client data comprises determining one or more combinations of indicators indicated by the client data.

12. The system of claim 1, wherein determining whether the indicator comprises the fingerprint based at least in part on the frequency analysis comprises determining a frequency of occurrence of the fingerprint within the client network.

13. The system of claim 1, wherein determining whether the indicator comprises the fingerprint based at least in part on the frequency analysis comprises determining a frequency of occurrence of the fingerprint on the Internet.

14. The system of claim 1, wherein it is determined that the indicator comprises the fingerprint when a frequency of occurrence of the fingerprint within the client network is greater than a frequency of occurrence of the fingerprint on the Internet.

15. The system of claim 1, wherein it is determined that the indicator comprises the fingerprint when a frequency of occurrence of the fingerprint within the client network is greater than a threshold.

16. The system of claim 1, wherein it is determined that the indicator comprises the fingerprint when a frequency of occurrence of the indicator on the Internet is less than a threshold.

17. The system of claim 1, wherein the fingerprint comprises one or more of the following: a set of open ports, a set of services and associated ports, a certificate, a public encryption key, a text pattern, a domain name, a host name, a combination of identifying elements.

18. The system of claim 1, wherein determining whether the indicator comprises the fingerprint is based at least in part on the score used to rank the indicator.

19. The system of claim 16, wherein the score related to the frequency is based at least in part on a percentile of a frequency of occurrence of the indicator within a known client network.

20. The system of claim 16, wherein the score related to the frequency is based at least in part on a percentile of the frequency of occurrence of the indicator in the Internet.

21. A method for determining a fingerprint associated with a client network, comprising:
receiving, using a device residing outside the client network and configured to communicate with the client network via Internet, an indication to determine the fingerprint using client data comprising a set of publicly available information associated with the client network;
determining, using a processor, a set of indicators based at least in part on the client data;
for an indicator in the set of indicators determining whether the indicator comprises the fingerprint based at least in part on a frequency analysis, the frequency analysis including:
determining a first frequency indicating how frequently the indicator associated with a configuration of a network appears within the client network and a second frequency indicating how frequently the indicator appears within other networks that are different than the client network;
determining that the indicator comprises the fingerprint associated with the client network when all of the following conditions are satisfied:
the first frequency is greater than the second frequency,
the first frequency is above a first threshold, and
the second frequency is below a second threshold; and
in response to completing the frequency analysis to determine whether the indicator comprises the fingerprint, calculating a score associated with the indicator based on the first frequency and the second frequency;
ranking the set of indicators based on the score;
creating a fingerprint database based on the score by:
traversing the ranked set from a highest score to a lowest score;
adding the traversed indicator to the fingerprint database; and
terminating the traversal when a predetermined number of fingerprints is added to the fingerprint database.

22. A computer program product for determining a fingerprint associated with a client network, the computer program product being embodied in a non-transitory computer readable storage medium and comprising computer instructions for:
receiving, using a device residing outside the client network and configured to communicate with the client network via Internet, an indication to determine the fingerprint using client data comprising a set of publicly available information associated with the client network;
determining a set of indicators based at least in part on the client data;
for an indicator in the set of indicators determining whether the indicator comprises the fingerprint based at least in part on a frequency analysis, the frequency analysis including:
determining a first frequency indicating how frequently the indicator associated with a configuration of a network appears within the client network and a second frequency indicating how frequently the indicator appears within other networks that are different than the client network; determining that the indicator comprises the fingerprint associated with the client network when all of the following conditions are satisfied:
the first frequency is greater than the second frequency,
the first frequency is above a first threshold, and
the second frequency is below a second threshold; and
in response to completing the frequency analysis to determine whether the indicator comprises the fingerprint, calculating a score associated with the indicator based on the first frequency and the second frequency;
ranking the set of indicators based on the score;
creating a fingerprint database based on the score by:
traversing the ranked set from a highest score to a lowest score;
adding the traversed indicator to the fingerprint database; and
terminating the traversal when a predetermined number of fingerprints is added to the fingerprint database.

* * * * *